3,393,982

FERROMAGNETIC STORAGE DEVICES HAVING UNIAXIAL ANISOTROPY

Robert D. Fisher and Harold E. Haber, Dayton, Ohio, assignors to The National Cash Register Company, Dayton, Ohio, a corporation of Maryland No Drawing. Continuation of application Ser. No. 236,451, Nov. 8, 1962. This application June 8, 1966, Ser. No. 555,967
2 Claims. (Cl. 29—194)

ABSTRACT OF THE DISCLOSURE

An improved uniaxial ferromagnetic data storage device is obtained by depositing a ferromagnetic thin film on an electrolessly deposited nickel-phosphorus layer.

This application is a continuation of United States patent application Ser. No. 236,451, filed Nov. 8, 1962, now abandoned, by Robert D. Fisher and Harold E. Haber.

The present invention relates generally to magnetic circuit devices and more particularly to a new and improved process of fabricating magnetic devices capable of being utilized by electronic computers and data processors information storage and logical purposes.

In a publication entitled "Computer Memories: A Survey of the State of the Art," by J. A. Rajchman, which appeared in the January 1961, issue of The Proceedings of the IRE, substantially all of the various types of devices which have heretofore been proposed for utilization by electronic computers and data processors for information storage and logical purposes are described in some detail.

Magnetic materials having a uniaxial anisotropy are most readily magnetized along one particular axis, commonly referred to as the easy axis of magnetization, and are equally readily magnetizable in either direction along the easy axis. The magnetic properties of such materials have been measured and evaluated by several methods, perhaps the best known and most widely used method being the graphical representation of the magnetic hysteresis loop obtained when a magnetic field is applied to the magnetic material in such a manner as to cyclically reverse the polarity of saturation magnetization thereof. The hysteresis loop may be obtained by plotting the normalized flux change in a given direction versus the normalized field change.

It is generally desired for data storage purposes that the hysteresis loop be perfectly rectangular in shape when representative of cyclic magnetization reversal along the easy axis of magnetization, and is linear—that is, having zero area under the loop—when representative of cyclic magnetization reversal in a direction transverse to the easy axis, which direction is commonly termed the "hard" direction of magnetization.

It has previously been discovered that thin magnetic films are capable of switching by a so-called "rotational" reversal process which has the advantage of a more rapid switching speed than conventionally employed magnetic cores, which generally switch by a domain wall movement process. In the case of domain wall switching, small regions or domains in the material effectively progress through the material until all the magnetic moments are substantially aligned in the direction of the applied external field. The term "thin film," as herein employed, designates a magnetic element having rotational switching characteristics. Magnetic thin films of the type herein employed are so fabricated that they contain an easy axis magnetization, and have a thickness generally within the range of 200 to 2,000 angstroms.

Rotational switching of magnetic thin films are commonly classified as either coherent or incoherent. Coherent and incoherent rotational switching may be defined in terms of the direction of rotation which the magnetic moments undergo upon application of an external magnetic field. Simultaneous rotation of all the magnetic moments in a thin film material under the influence of an applied field wherein all the moments rotate in a given direction—i.e., all rotate clockwise or counter-clockwise—is termed coherent rotation, while random rotation of the moments—i.e., some clockwise and the remaining counter-clockwise—is termed incoherent rotation.

In an ideal magnetic thin film, all magnetic moments within the film are in exact alignment with the preferred direction of magnetization. However, it has been found that not all moments are in exact alignment with the preferred direction, but, instead, a certain percentage of the moments are generally oriented at some positive dispersion angle with respect to the preferred direction, and another small percentage of the moments are oriented at some negative dispersion angle with respect to the preferred direction. Thus, the preferred direction of magnetization of the film is in reality the resultant direction of all magnetic moments within the film. An ideal thin film is one in which all magnetic moments within the film are in exact alignment with each other, so that the angles of dispersion are zero.

The application of a magnetic field transverse to the preferred direction of magnetization and parallel to the plane of the film, therefore at substantially right angles to the average of the magnetic moments, applies a torque to all the moments within the film, so that all moments are caused to rotate in either a clockwise or a counter-clockwise direction, depending upon the direction of the applied field. Under the influence of the transverse field, the moments of the element can only switch to a maximum of 90 degrees with respect to the preferred direction of magnetization. It is, therefore, incumbent to provide, during the application of the transverse field, another field which is parallel to the plane of the film and in such a direction as to produce a torque component of predetermined magnitude parallel to the easy axis, to cause a complete 180-degree reversal of the moments of the film. If, then, in combination, a transverse field and a parallel field are applied to the thin film, substantially all the moments switch by rotation in a given direction—i.e., either all clockwise or all counter-clockwise—and thus switching is accomplished by coherent rotation. In this instance, it is assumed that the parallel field is, in and of itself, of insufficient magnitude to cause reversal, but only in combination with the transverse field is reversal accomplished.

However, if a parallel field were applied to the thin film of sufficient magnitude alone to cause switching of the direction of magnetization, then, as previously discussed, since the individual moments are not in exact alignment with the resultant or preferred direction of magnetization, some of the moments are caused to rotate clockwise while the remaining moments are caused to rotate counter-clockwise. Thus, upon application of a magnetic field which is parallel to the preferred direction of magnetization of the thin film element and is of a sufficient magnitude to cause rotational reversal of the moments, switching is accomplished by incoherent rotation.

It is known that the surface configuration and makeup of the non-magnetic substrate onto which the thin magnetic film is to be deposited, or otherwise formed, is of primary importance in determining the crystal growth, uniformity of alloy composition, magnetic orientation, and internal stress characteristics of electrodeposited films. For example, it is well known that the composition of an electrodeposited alloy is dependent upon the cathode potential in the system to such extent that it is critically necessary for the cathode potential to be uniform and to remain absolutely constant throughout the entire surface area of the depositing substrate. It is for this reason that a rough substrate surface results in considerable deviation of local cathode potentials on the peaks, as compared with the valleys thereof, to such an extent that a deposit is formed thereon having considerable local compositional gradients with respect to the overall background composition of the deposit. It is generally believed that this nonhomogeneity of composition, combined with the inherent internal stress operating through the variable magnetostriction due to nonuiformity of composition, is the primary cause of the resulting poor uniaxial anisotropy and other essential magnetic properties of the device.

Consequently, it has heretofore been generally considered by those skilled in the art of thin film magnetics that it is essential for the depositing substrate surface to be extremely smooth and amorphous; i.e., having no grain structure. To accomplish this, smooth glass slides have extensively been used as the substrate for vacuum-deposited films. In the case of electrodeposition of thin magnetic films, a non-magnetic conductive substrate is utilized which generally comprises either sputtered gold on glass or vacuum evaporated chromium on glass followed by sputtered gold. It is obvious, of course, that any process which necessitates the use of a precious non-magnetic material such as gold, and the like, would be unsuitable for commercial purposes wherein the devices are mass-produced in extremely large quantities. Even the cost of those produced for laboratory purposes may be prohibitive.

Therefore, the primary object of the present invention is to devise a new and improved process for fabricating a new and improved thin magnetic film device in a simple and economical manner, which device possesses greatly improved magnetic and other characteristics than heretofore possible.

Another object of the present invention is to devise such a new and improved fabrication process, whereby improved thin magnetic film devices are fabricated having consistently uniform magnetic properties throughout the entire surface thereof and from one device to another.

Still another object of the present invention is to devise a process for fabricating new and improved thin magnetic film devices which have a uniaxial anisotropy and are capable of magnetically switching by a rotational reversal process.

Another object of the present invention is to devise a process for fabricating new and improved thin magnetic film devices which have a substantially rectangular hysteresis loop characteristic and a minimum dispersion angle.

A more specific object of the present invention is to devise a new and improved process for economically fabricating, by mass production techniques, thin magnetic film devices consistently having improved and uniform magnetic properties throughout the surface area thereof, and from one device to another, which devices are readily adaptable to be utilized by electronic computers and data processors for information storage and logical purposes.

In accordance with a broad aspect of the present invention, such a novel process of fabricating new and improved magnetic circuit devices comprises the steps of electrolessly depositing on a catalytically active substrate a continuous metallic and on-magnetic nickel coating having a substantially smooth surface characterized by a randomly oriented grain structure and a grain size generally less than .1 micron, and thereafter depositing a thin film of magnetic material having a uniaxial anisotropy onto the surface of the nickel coating.

It is well known to those skilled in the art of electroless deposition that reduction of metallic ions is essentially a controlled autocatalytic reduction process of the depositing species on a catalytically active metal such as aluminum, iron, nickel, cobalt, palladium, and the like, in the presence of hypophosphite ions. However, non-active metals, such as gold, silver, and copper, and alloys thereof, are normally rendered cataytically active by immersion deposition of palladium onto the surface thereof. In the case of non-conducting materials, such as glass, ceramics, plastics, and the like, activation is normally accomplished by immersing the object in a solution of stannous ions, followed by immersion in a palladium chloride solution, whereby the palladium ions in solution are spontaneously reduced by the adsorbed stannous ions, thereby rendering the surface catalytically active. Alternatively, such non-conducting materials may be rendered catalytically active by chemical or vacuum deposition thereon of a copper, gold, or silver film, followed by immersion deposition of palladium onto the surface of the film.

The particular substrate onto which the nickel coating is to be electrolessly deposited may be any of the various metallic or non-metallic materials that are either inherently catalytically active or are rendered catalytically active in any well-known manner. Due to the fact that the throwing power of electroless nickel solutions is unity, so that a deposit of constant thickness is formed on all projections, corners, holes, etc., it is preferred that the chosen substrate surface be as smooth as possible in order to insure the required smoothness of the nickel deposit.

As a typical example, a relatively thin sheet or ribbon (0.003 inch thick) of polyethylene terephthalate, commonly sold under the trademark "Mylar," is ideally suited to be utilized as substrate material in the devised fabrication process.

To insure uniform chemical reduction throughout the entire surface area of the substrate, it is preferred that the substrate first be rigorously cleaned by immersion in a one molar concentration of sodium hydroxide solution, followed by a thorough rinsing in distilled water, a subsequent immersion in a 1/1 dilution of hydrochloric acid solution, again followed by a thorough rinsing in distilled water, and thereafter thoroughly rinsed in acetone. Even though a specific cleaning operation is herein shown and described, it is of course to be appreciated that any of the well-known alkaline-acid-water cleaning procedures may be used with equal success.

While not essential to the present process, but only in order to improve adhesion of the nickel coating on the Mylar substrate, it is preferred that the substrate surface next be coated with a suitable commercially available adhesive prior to deposition of metallic nickel thereon. While substantially any of the various commercially available adhesives may be used with equal success, such as, for example, those which are shown, and the use of which is illustrated, in United States Patents Nos. 1,037,887, 2,351,940, 2,917,439, and 3,219,471, it is preferred to utilize a commercially available adhesive consisting essentially of a linear polyester solution resin known as "Vitel–PE200 Resin," as currently manufactured by the Goodyear Tire and Rubber Company, Chemical Division, Akron, Ohio, and as described in detail in publications of the Goodyear Tire and Rubber Company entitled "Tech. Book Facts," No. 2MRB1161 and No. 11M960.

It is preferred to prepare the adhesive by dissolving approximately 648 grams of Vitel–PE200 Resin in approximately 6500 grams of dioxane solvent at room temperature. The Mylar substrate is then dipped into the adhesive solution, slowly withdrawn at a rate of approximately 10 inches per minute, and then cured for approximately five minutes at a temperature of approximately 300 degrees Fahrenheit. It is to be noted that the particular method chosen for applying the adhesive coating to the substrate is not critical, although it is preferred that the adhesive coating be uniformly distributed over the surface thereof. In fact, if there is no necessity for a complete and absolute bond between the nickel coating and the substrate surface, the use of an adhesive may be dispensed with altogether. It is, of course, obvious that the intended use of the magnetic device dictates the degree of bond required between the nickel coating and the surface of the depositing substrate.

The adhesive-coated substrate is next preferably activated by immersion for approximately thirty seconds in a 20 grams/liter aqueous stannous chloride solution containing approximately 10 milliliters/liter of concentrated hydrochloric acid, the temperature of the stannous chloride solution being maintained substantially constant at approximately 25 degrees centigrade and its pH maintained substantially constant at approximately 0.9.

Thereafter, the substrate is rinsed and immersed for a period of approximately four minutes in an aqueous palladium chloride solution having a concentration of approximately 0.5 gram/liter and containing approximately 5 milliliters of concentrated hydrochloric acid per liter of solution, the temperature of the palladium chloride solution being maintained substantially constant at approximately 25 degrees centigrade.

Once the adhesive-coated substrate is thus rendered catalytically active and is thereafter capable of receiving a metallic deposit thereon by electroless deposition, the activated substrate is rinsed and then immersed from 1½ to 2½ minutes, preferably 2 minutes and 10 seconds, in an electroless nickel plating solution containing from 25 to 35, preferably 30, grams/liter nickel chloride, from 1.5 to 15, preferably 2.5 grams/liter sodium hypophosphite, from 40 to 60, preferably 50, grams/liter ammonium chloride, and from 75 to 125, preferably 100, grams/liter sodium citrate. The pH of the solution is maintained substantially constant within the range of from 7.6 to 9.2, preferably 8.8, while its temperature is maintained substantially constant within the range of 60 degrees centigrade to 80 degrees centigrade, preferably 71 degrees centigrade.

The surface of the electrolessly deposited nickel is inherently substantially smooth and continuous; that is, it is devoid of undesirable pits, voids, cracks, etc.; has a randomly-oriented fine-grained structure; and is non-magnetic and isotropic. The average grain size of the nickel coating as determined by indirect computational methods (electron microscopy) is less than 0.1 micron. The thickness of the nickel coating has been found to range from 200 to 1,200 angstroms and is sufficient to effectively remove any epitaxial effects of the substrate surface.

The uniaxial anisotropic magnetic thin film material to be deposited or otherwise formed on the surface of the electrolessly deposited nickel coating preferably comprises an average 81%–19% nickel-iron permalloy composition having zero magnetostriction and deposited in the presence of a magnetic field to a thickness within the range of 200 to 2,000 angstroms. However, it is to be pointed out that the particular magnetic alloy and the particular deposition process selected for producing uniaxial anisotropic magnetic thin film materials are not critical and may be any of those well known in the art. Illustrative examples of various such thin film deposition processes are found in the following publications: "Fabrication and Properties of Memory Elements Using Electrodeposited Thin Magnetic Films," by Wolf, Katz, and Brains, Proceedings of Electronic Components Conference, 1960, pages 15 to 21; "Composition and Thickness Effects on Magnetic Properties of Electrodeposited Nickel-Iron Thin Films," by I. W. Wolf, Journal of Electrochemical Society, October 1961, pages 959 to 964; "The Preparation and Characteristics of Thin Ferromagnetic Films," Scientific Report No. 1, United States Air Force Contact AF19(604)–4978; "Chemically Deposited Nickel-Cobalt Layers as High Speed Storage Elements," by R. J. Heritage and M. J. Walker, Journal of Electronics and Control, vol. 7, 1959, beginning with page 542; Journal of Applied Physics, vol. 26, 1955, beginning with page 975; and United States Patents Nos. 3,030,612 and 3,037,199. It is, of course, to be appreciated that the above listing is by no means exhaustive of the state of the magnetic thin film art.

In the preferred process, the electroless nickel surface is exposed as a cathode for approximately 260 seconds to electrolytic action in a plating bath consisting essentially of 218 grams/liter of nickel sulphate ($NiSO_4 \cdot 6H_2O$), 6.74 grams/liter of ferric chloride ($FeCl_3 \cdot 6H_2O$), 40 grams/liter of boric acid, and 1.5 grams/liter of saccharin (O-benzoyl-sulfimide, sodium salt), the pH of the bath being maintained substantially constant at approximately 2.47, its tmeperature being maintained substantially constant between 20 degrees centigrade and 30 degrees centigrade, and the current density being maintained substantially constant at approximately 5 milliamperes/square centimeter. It is further preferred that deposition take place in the presence of a uniform magnetic field of approximately 100 oersteds oriented parallel to the plane of the depositing surface, whereby the magnetic moments within the film are generally aligned in the same direction as the magnetic field, so that an axis of easy magnetization is established in the magnetic film.

It has been found that the chemically reduced non-magnetic nickel coating causes a considerable reduction in the wall coercive force (Hc) along the easy direction and the anisotropy field (Hk) of the magnetic thin film material deposited thereon, but more significantly is the increase in the ratio of the value of the maximum field expressed in oersteds at which rotational flux reversal occurs (Hr) to the value of the anisotropy field (Hk) expressed in oersteds, which ratio designates the extent or degree of uniaxial anisotropy. The ratio Hr/Hk, usually expressed as a percent, expresses the percent of drive field (Hk) over which the hard direction hysteresis loop remains closed, so that a perfect uniaxial anisotropy is indicated when the ratio Hr/Hk equals 100 percent.

Typical magnetic properties of thin film devices fabricated in accordance with the present invention are as follows:

Hc=0.9 oersteds
Hk=2.8 oersteds
Hr/Hk=90–99 percent
$\alpha$ max.=±4 degrees
$\alpha\ q$=±1 degree where $\alpha$ max. is the maximum dispersion angle of the easy axis expressed in degrees, and $\alpha\ q$ is the quartile dispersion angle of the easy axis expressed in degrees.

The following is a brief description of essentially the same novel fabrication process as just described in detail, except in this instance a typical example will be given of the use of a metallic substrate which is composed of a metal which is not inherently catalytically active, as are such metals as aluminum, iron, nickel, cobalt, and palladium, rather than a non-conductor such as Mylar, as in the previous example. It is of course to be understood that any of the above-mentioned catalytically active metals may also be used with equal success. As previously mentioned, the class of non-catalytically-active materials include such metals as gold, silver, copper, and the like, including alloys thereof.

In this particular example, a layer of silver of approximately 500 angstroms thick is chemically reduced on an optically smooth glass microscope slide, and, thereafter, a 6-mil copper coating is deposited onto the silver coating to provide a rigid support for the silver coating when it is removed from the glass slide. Thereafter, the laminated silver-copper coating is peeled from the glass slide in a normal manner. Due to the fact that the just-mentioned procedure is well known in the electroforming art, a detailed description thereof is not deemed necessary. However, for such a detailed description, reference is made to the textbook entitled "Principles of Electroplating and Electroforming," third ed., by Blum and Hogaboom, chs. 8 and 12, pp. 220 to 235 and 288 to 306, respectively, wherein a full and complete description of the just-described electroforming procedure is given in detail; additional information may be found in United States Patents Nos. 1,574,544, 2,380,827, 2,214,476, and 2,337,282.

After being cleaned and dried, the silver coating is immersed in the before-described palladium chloride solution for approximately 10 to 20 seconds and is rinsed, and thereafter an electroless non-magnetic nickel coating and a subsequent nickel-iron thin film magnetic coating are applied to the silver surface in the same sequence and in exactly the same manner as previously described.

In this instance, a measurement of the magnetic properties of the resulting device, as compared with the identical device from which the electroless non-magnetic nickel coating was omitted, showed a decrease in the value of Hc from approximately 7.0 oersteds to approximately 1.0 oersted, a decrease in the value of Hk from approximately 15.0 oersteds to approximately 2.8 oersteds, an increase in the value of Hr/Hk from approximately 10% to approximately 95%, a decrease in the value of $\alpha$ max. from approximately 15 degrees to approximately 7 degrees, and a decrease in the value of $\alpha\ q$ from greater than 1.5 degrees to less than 1 degree.

While particular embodiments of the invention have been shown and described in detail, it will be obvious to those skilled in the magnetic thin film art that changes and modifications may be made from the invention in its broader aspects, and, therefore, the aim in the appended claims is to cover all such changes and modifications as fall within the true spirit and scope of the invention.

What is claimed is:

1. A thin ferromagnetic film storage device having uniaxial anisotropy, comprising (a) a catalytically-active substrate, and (b) a non-magnetic nickel-phosphorus layer, said non-magnetic nickel-phosphorus layer being electrolessly deposited onto the catalytically-active substrate from a plating solution with a pH range of approximately 7.6 to 9.2 which includes as essential ingredients from 25 to 35 grams/liter of nickel chloride, from 1.5 to 15 grams/liter of sodium hypophosphite, from 40 to 60 grams/liter ammonium chloride, and from 75 to 125 grams/liter sodium citrate, the deposition of said electrolessly-deposited non-magnetic nickel-phosphorus layer occurring with a solution temperature from 60 degrees centigrade to 80 degrees centigrade and an immersion time from 90 to 150 seconds, said electrolessly-deposited non-magnetic nickel-phosphorus layer being further characterized by a randomly-oriented grain structure with an average grain size of less than 0.1 micron, and (c) a uniaxial anisotropic ferromagnetic thin film material deposited on said non-magnetic nickel-phosphorus layer in the presence of a magnetic orienting field.

2. A device as in claim 1 wherein the plating solution includes as essential ingredients 30 grams/liter nickel chloride, 2.5 grams/liter sodium hypophosphite, 50 grams/liter ammonium chloride, and 100 grams/liter sodium citrate, and the solution temperature is 71 degrees centigrade, the pH is 8.8, and the plating time is 130 seconds.

References Cited

UNITED STATES PATENTS

| | | | |
|---|---|---|---|
| 3,098,803 | 7/1963 | Godycki et al. | 204—38 |
| 3,102,048 | 8/1963 | Gran et al. | 117—61 |
| 3,110,613 | 11/1963 | Bean | 117—71 |
| 3,116,159 | 12/1963 | Fisher et al. | 117—71 |
| 3,119,753 | 1/1964 | Mathias et al. | 204—43 |
| 3,150,939 | 9/1964 | Wenner | 29—195 |
| 3,257,629 | 6/1966 | Kornreich | 333—31 |

OTHER REFERENCES

Wolf, Irving W., "Composition and Thickness Effects On Magnetic Properties of Electrodeposited Nickel-Iron Thin Films," J. Electrochem. Soc., vol. 108, No. 10, pp. 959–964 (October 1961).

WILLIAM D. MARTIN, *Primary Examiner.*

W. D. HERRICK, *Assistant Examiner.*